(12) United States Patent
Nel et al.

(10) Patent No.: US 8,512,441 B2
(45) Date of Patent: Aug. 20, 2013

(54) RECOVERY OF A GASEOUS COMPONENT FROM A MIXTURE OF GASEOUS COMPOUNDS

(75) Inventors: Johannes Theodorus Nel, Kempton Park (ZA); Izak Jacobus Van Der Walt, Krugersdorp North (ZA); Alfred Teo Grunenberg, Krugersdorp (ZA); Odolphus Simon Leo Bruinsma, Potchefstroom (ZA); Marco Le Roux, Potchefstroom (ZA); Henning Manfred Krieg, Potchefstroom (ZA); Sanette Marx, Potchefstroom (ZA)

(73) Assignees: The South African Nuclear Energy Corporation Limited, District Brits (ZA); North-West University, Potchefstroom (ZA)

( * ) Notice: Subject to any disclaimer, the term of this patent is extended or adjusted under 35 U.S.C. 154(b) by 198 days.

(21) Appl. No.: 13/001,769

(22) PCT Filed: Jul. 6, 2009

(86) PCT No.: PCT/IB2009/052933
§ 371 (c)(1),
(2), (4) Date: Dec. 28, 2010

(87) PCT Pub. No.: WO2010/001368
PCT Pub. Date: Jan. 7, 2010

(65) Prior Publication Data
US 2011/0094377 A1 Apr. 28, 2011

(30) Foreign Application Priority Data
Jul. 4, 2008 (ZA) .................................. 2008/05872

(51) Int. Cl.
*B01D 53/22* (2006.01)
(52) U.S. Cl.
USPC .................... 95/48; 95/45; 96/4; 96/11; 96/12
(58) Field of Classification Search
USPC ...................... 95/45, 48; 96/4, 7, 9, 11, 12, 13
See application file for complete search history.

(56) References Cited

U.S. PATENT DOCUMENTS

| 4,919,694 A | * | 4/1990 | Hata et al. | 96/12 |
| 5,698,011 A | * | 12/1997 | Chung et al. | 95/48 |
| 5,730,779 A | | 3/1998 | Chernyakov et al. | |
| 5,858,066 A | * | 1/1999 | O'Brien et al. | 95/48 |

(Continued)

FOREIGN PATENT DOCUMENTS

| EP | 0 649 676 | 4/1995 |
| EP | 0 853 970 | 7/1998 |

*Primary Examiner* — Jason M Greene
(74) *Attorney, Agent, or Firm* — Pabst Patent Group LLP (57) ABSTRACT

A process for recovering a gaseous component comprising at least one fluorine-containing compound from a mixture of gaseous compounds. The process includes, in a separation zone (12), bringing a mixture of gaseous constituents, including at least one fluorine-containing constituent, into contact with a gas permeable separating medium (16) comprising a polymeric compound, so that a first gaseous component comprising at least one fluorine-containing constituent is separated from a second gaseous component comprising the balance of the gaseous constituents. The first gaseous component is withdrawn from the separation zone as a permeate (34) or a retentate, while the second gaseous component is withdrawn from the separation zone as the retentate (26), when the first gaseous component is withdrawn as the permeate, and as the permeate, when the first gaseous component is withdrawn as the retentate.

10 Claims, 8 Drawing Sheets

(56) References Cited

U.S. PATENT DOCUMENTS

| | | | |
|---|---|---|---|
| 5,976,222 A | 11/1999 | Yang et al. | |
| 6,187,077 B1 * | 2/2001 | Li | 95/48 |
| 6,565,821 B1 * | 5/2003 | Fraysse | 95/48 |
| 6,669,760 B1 * | 12/2003 | Henderson et al. | 95/131 |

* cited by examiner

RECOVERY OF A GASEOUS COMPONENT FROM A MIXTURE OF GASEOUS COMPOUNDS

CROSS REFERENCE TO RELATED APPLICATIONS

This application is a national phase filing under 35 U.S.C. §371 of PCT/IB2009/052933 filed under the Patent Cooperation Treaty on Jul. 6, 2009, which claims priority to and benefit of South African application No. 2008/05872 filed Jul. 4, 2008, the contents of each being hereby incorporated by reference in their entirety.

THIS INVENTION relates to the recovery of a gaseous component comprising at least one fluorine-containing compound from a mixture of gaseous compounds. It relates in particular to a process and to an installation for effecting such a recovery.

It is difficult to separate mixtures of gaseous fluorine-containing compounds into the respective compounds on a commercial basis, e.g. to recover from such a gaseous mixture at least one desired fluorine-containing gaseous compound, as a result of, amongst other, the hazardous nature of some fluorine-containing compounds and certain difficulties associated with the cryogenic separation processes normally employed. Hitherto, such separation has primarily been effected in separation columns or the like. It is now desired to effect such separation more economically and more effectively than has hitherto been the case, and it is hence an object of this invention to provide a process for achieving this.

Thus, according to a first aspect of the invention, there is provided a process for recovering a gaseous component comprising at least one fluorine-containing compound from a mixture of gaseous compounds, which process includes in a separation zone, bringing a mixture of gaseous constituents, including at least one fluorine-containing constituent, into contact with a gas permeable separating medium comprising a polymeric compound, so that a first gaseous component comprising at least one fluorine-containing constituent is separated from a second gaseous component comprising the balance of the gaseous constituents;

withdrawing the first gaseous component from the separation zone as a permeate or a retentate; and withdrawing the second gaseous component from the separation zone as the retentate, when the first gaseous component is withdrawn as the permeate, and as the permeate, when the first gaseous component is withdrawn as the retentate.

While the mixture of gaseous constituents may, at least in principle, comprise a plurality of different gaseous fluorine-containing constituents in admixture with one another, or a single fluorine-containing constituents in admixture with a plurality of gaseous non-fluorine-containing constituents, or even a plurality of gaseous fluorine-containing gaseous constituents and a plurality of gaseous non-fluorine-containing constituents, it is believed that the invention will have particular application to binary gaseous mixtures, i.e. gaseous mixtures made up of either two different gaseous fluorine-containing constituents in admixture with each other, or a single gaseous fluorine-containing constituents in admixture with a single gaseous non-fluorine-containing constituent.

The gaseous constituents may be in the form of compounds or elements; however, the fluorine-containing constituent will usually be in the form of a compound.

Thus, the gaseous mixture may comprise two or more different organic fluorine-containing compounds or fluorocarbons. The gaseous fluorocarbons may be selected from carbon tetrafluoride ($CF_4$), tetrafluoroethylene ($C_2F_4$), hexafluoroethane ($C_2F_6$), hexafluoropropylene ($C_3F_6$), octafluoropropane ($C_3F_8$) and octafluorobutylene and its isomers ($C_4F_8$-isomers) in admixture with one another, with it then being desired to recover at least one of these gaseous compounds in a more-or-less pure state. For example, the gaseous mixture may be a binary gaseous mixture comprising $CF_4$ and $C_3F_6$ in admixture with each other, with it being desired to recover one or both of these compounds. Instead, however, the gaseous mixture may comprise a single gaseous fluorocarbon as listed hereinbefore in admixture with one or more inert gas such as $N_2$, air, Ar and He, with it then naturally being desired to recover the gaseous fluorine-containing compound.

The separating medium may, in particular, comprise a membrane such as a diffusion membrane. At least a portion or a zone of the membrane will thus contain or comprise the polymeric compound, which may, for example, be a non-porous fluoropolymer. In particular, the membrane may comprise a base or support of filamentous material, with at least one outer surface of the base or support being coated with the polymeric compound. Instead, a zone of the base material may be impregnated either completely or partially with the polymeric compound. The impregnated zone of the base may comprise the entire thickness of the base or may be a layer, which may be inside the base or adjacent to one surface of the base. Thus, the porous base may comprise a plurality of intermingled or interwoven filaments or threads of a material such as polyacrylonitrile (PAN) or polytetrafluoroethylene (PTFE), with at least one surface of the porous base being coated or impregnated with a non-porous fluoropolymeric compound, which may be PTFE. Preferably, when only one of the surfaces of the base is coated or impregnated with the polymeric compound, then the coated or impregnated surface faces upstream relative to the gaseous mixture to be treated.

The process may include controlling the temperature in the separation zone while the gaseous mixture is being separated into the first and second components. Thus, the separation zone may be controlled at a selected temperature in a range from a cryogenic temperature to an elevated or above ambient temperature. More particularly, the separation zone may be controlled at a predetermined temperature between $-100°$ C. and $+200°$ C., more preferably between $-40°$ C. and $50°$ C., e.g. at about $25°$ C.

The process may also include maintaining or controlling the separation zone, upstream of the membrane, at an elevated pressure. Thus, the process may include feeding the gaseous mixture into the separation zone at an elevated pressure. While the elevated pressure may be up to 200 bar(a), it more typically will be between 0 bar(a) and 10 bar(a). By 'a' is meant "absolute pressure" as compared to a gauge pressure which is the pressure measured relative to the atmosphere as indicated on a pressure gauge, and which is indicated by 'g'. It will be appreciated that, if necessary, e.g. if the gaseous mixture feed pressure is sufficiently high, the membrane must then be mechanically supported, e.g. on a sintered metallic, ceramic or polymeric support.

Preferably, the pressure in the separation zone, upstream of the membrane, may be maintained or controlled at a value between 1 kPa(a) and 400 kPa(a). It will be appreciated that there will be a pressure drop across the membrane, i.e. there will be a trans-membrane pressure differential. The trans-membrane pressure differential or membrane pressure drop may vary between 0 kPa and 400 kPa. Preferably, the gaseous mixture feed pressure is in the range of 30 kPa above ambient, i.e. 30 kPa(g), to 400 kPa(a), while the membrane pressure drop may be in the range 10 kPa to 400 kPa.

In one embodiment of the invention, the separation zone may be a first separation zone, with a second separation zone, also containing a membrane of which at least a portion comprises a polymeric compound, being provided, the membrane of the second separation zone having a different flux and/or a different selectivity towards the fluorine-containing constituent than the membrane of the first separation zone; the process may then include

- introducing the mixture of gaseous constituents into the first separation zone, with the first gaseous component including, in addition to the at least one fluorine-containing constituent, also at least one other gaseous constituent as a contaminant;
- feeding the first gaseous component into the second separation zone; and
- withdrawing, from the second separation zone and as a permeate or a retentate, a second gaseous component having a higher concentration of the fluorine-containing constituent than the first gaseous component.

For example, the membrane of the second separation zone may have a lower flux and higher selectivity towards the fluorine-containing constituent than the membrane of the first separation zone. The process may then include introducing the mixture of gaseous constituents into the first separation zone at a high pressure; maintaining a first set of operating conditions, which may include a high trans membrane differential pressure or membrane pressure drop in the first separation zone; feeding the first gaseous component into the second separation zone at a lower pressure than that at which the mixture of gaseous constituents is introduced into the first separation zone; and maintaining a second set of operating conditions, which may include a lower membrane pressure drop than in the first separation zone, in the first separation zone.

While the membrane of the second separation zone may be similar to that of the first separation zone, eg as regards the construction of its base, its impregnation or coating with the polymeric compound, the material of its filaments, and its polymeric compound, it need not necessarily be similar. The membrane of the second separation zone will, however, be such that it has a lower flux and higher selectivity towards the desired fluorine-containing constituent than the membrane of the first separation zone.

In this embodiment of the invention, the first separation zone will thus constitute a roughing step or stage, while the second separation stage will constitute a polishing step or stage.

The process may then even include at least one further similar separation zone, eg a plurality of further similar separation zones, arranged in series with the membranes of the different separation zones having different fluxes and/or different selectivities towards said fluorine-containing constituent. Instead of, or in addition to, the membranes of the different separation zones having different fluxes and/or selectivities towards the fluorine-containing constituent, the different separation zones may be operated under varying conditions, particularly as regards temperature, pressure and/or trans membrane pressure differential or membrane pressure drop, to achieve higher combined separation efficiencies and yields of the fluorine-containing constituent. In particular, the separation zones may then be arranged in counter-current recirculation cascade fashion.

More particularly, the cascade arrangement may include an enriching section and a stripping section, with each of the sections comprising a plurality of the separation zones.

In another embodiment of the invention, the process may include subjecting the first gaseous component to further processing, eg to distillation, to enhance the yield of the fluorine-containing compound or the separation efficiency, or even to separate one fluorine-containing compound from another. The process may then even include producing the mixture of gaseous compounds.

For example, the process may then include reacting calcium fluoride and carbon in a plasma generation/quench stage to produce a range of gaseous product compounds including $C_2F_4$, $C_2F_6$, $C_3F_6$ and $CF_4$; subjecting the gaseous mixture thus produced to some purification and/or separation to obtain a gaseous mixture comprising $C_2F_4$, $C_2F_6$ and $C_3F_6$; subjecting this gaseous mixture to treatment in the separation zone to separate $C_2F_6$ from a mixture of $C_2F_4$ and $C_3F_6$; and then subjecting the mixture of $C_2F_4$ and $C_3F_6$ to distillation to obtain, as separate products, $C_2F_4$ and $C_3F_6$.

Each membrane may be a flat membrane, a hollow fibre membrane, a spiral-wound membrane, or the like.

According to a second aspect of the invention, there is provided apparatus for carrying out the process of the first aspect of the invention, the apparatus comprising

- a separation module providing a separation zone, with a gas inlet leading into the separation zone, a permeate outlet leading from the separation zone and a retentate outlet also leading from the separation zone; and
- a gas permeable membrane, at least one zone of which contains a polymeric compound, being located within the separation zone of the separation module, such that the gas inlet and retentate outlet are located on one side of the membrane, while the permeate outlet is located on another side of the membrane.

The membrane may be as hereinbefore described.

The apparatus may include temperature control means for controlling the temperature in the separation zone. The temperature control means may also be adapted to control the temperature of the membrane, e.g. simultaneously and in unison with controlling the separation zone temperature.

The apparatus may also include pressure control means, for controlling the pressure in the separation zone, at least upstream of the membrane.

The invention will now be described in more detail, with reference to the accompanying diagrammatic drawings.

Figure 1:
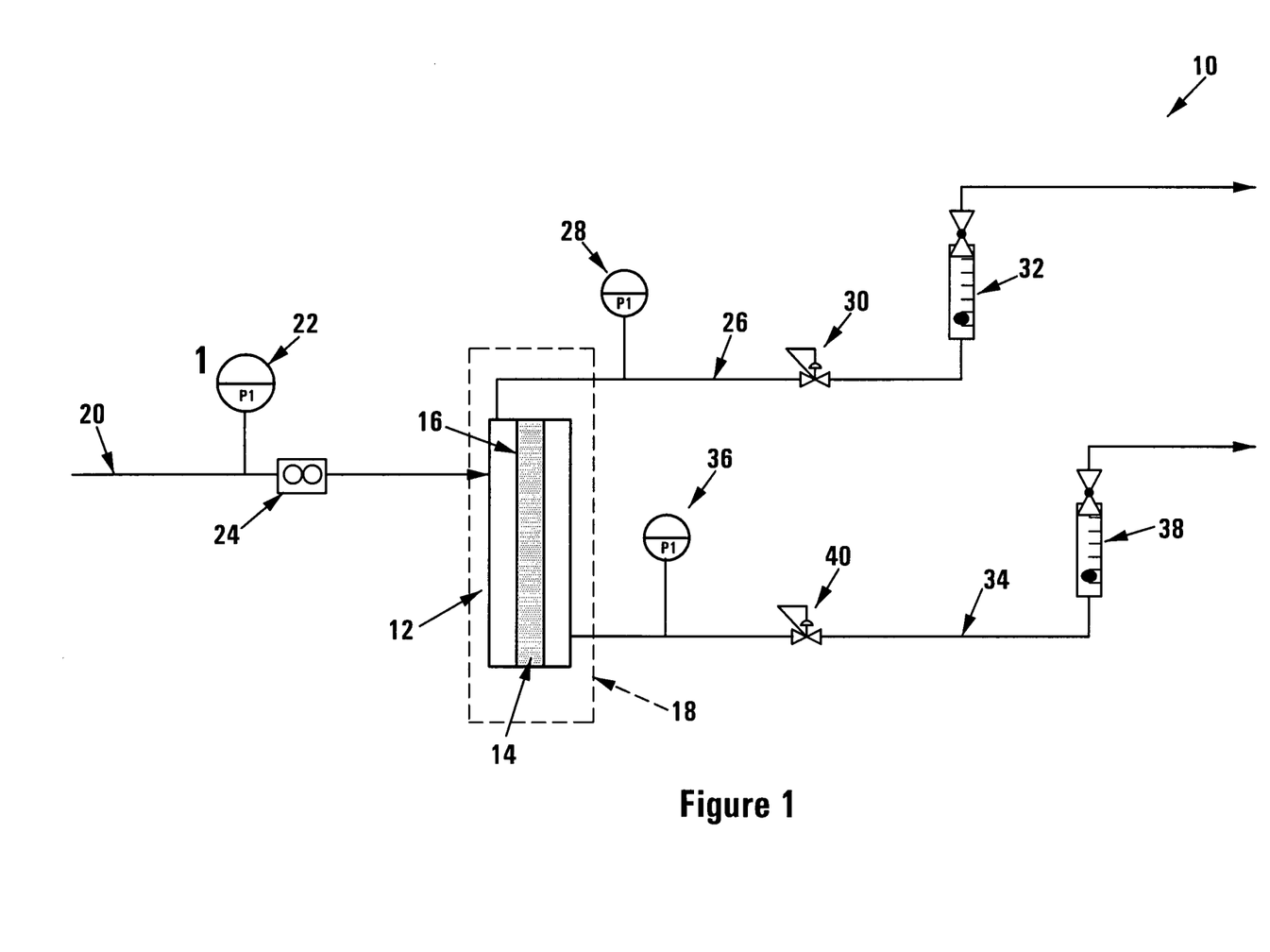
FIG. 1 shows, diagrammatically, apparatus according to the second aspect of the invention for recovering a gaseous component comprising at least one fluorine-containing compound from a mixture of gaseous compounds.

Referring to FIG. 1, reference numeral 10 generally indicates apparatus according to the second aspect of the invention for recovering a gaseous component comprising at least one fluorine-containing compound from a mixture of gaseous compounds.

The apparatus 10 includes a separation module, generally indicated by reference numeral 12, in which is located a gas permeable diffusion membrane 14. The membrane 14 comprises a porous base of interwoven polyacrylonitrile filaments or fibres, with an upstream surface 16 of the membrane being coated or impregnated with PTFE. The module 12 is surrounded by a temperature control unit 18 by means of which the temperature in the module can be maintained at a desired or set value.

A gaseous mixture feed line 20, fitted with a pressure regulator 22 and a mass flow controller 24, leads into the module 12, on the upstream side of the membrane 14.

A retentate withdrawal line 26 leads from the module 12, and specifically from upstream of the membrane 14. The line 26 is fitted with a pressure gauge 28, a back pressure regulator 30, and a flow meter 32.

A permeate withdrawal line 34 leads from the module 12 downstream of the membrane 14, and is fitted with a pressure gauge 36, a back pressure regulator 40 and a flow meter 38.

In use, a gaseous mixture containing a fluorine-containing gaseous compound which it is desired to recover, e.g. a mixture of hexafluoropropylene ($C_3F_6$) and nitrogen ($N_2$), is fed into the module 12 along the line 20. If necessary, a compressor (not shown) can be provided in the line 20. If further desired (not shown) a carrier or make-up gas stream line, e.g. a nitrogen line, can also be provided and will then be coupled to the line 20 downstream of the regulator 22.

The surrounding area of the module 12 may be ventilated, and the module itself is typically regulated, by means of the temperature control unit 18, so that a temperature of about 25° C. is maintained inside the module.

The back pressure regulator 30 can be used to regulate the upstream pressure on the membrane 14 as well as the flow rate in the retentate stream, if necessary. The downstream pressure of the retentate that is withdrawn along the line 26, is measured by the pressure gauge 28 while its volume flow is measured with the flow meter 32, which may typically be a rotameter. Similarly, the pressure and volume flow of the permeate stream withdrawn along the line 34 is measured by means of the pressure gauge 36 and the flow meter 38 respectively, while the trans-membrane pressure, i.e. the pressure differential or pressure drop across the membrane 14, is regulated by the back pressure regulator 40. In this manner, the permeation characteristics of the membrane 14 can be monitored e.g. in terms of permeance and selectivity.

The permeate stream withdrawn along the line 34 is appropriately recovered and sampled for consistency, and may be analyzed, e.g. with a calibrated gas chromatograph (not shown). The retentate stream withdrawn along the line 26 may be vented to an off-gas system or similarly collected and analyzed.

The temperature control unit 18 may include ohmic heating coils and a thermostat for thermostatically controlling the inside of the separation module at a desired temperature. Instead, if necessary and if desired, the temperature control unit 18 may comprise cryogenic cooling coils for controlling the inside of the separation module at a desired temperature. Thus, the selection of the temperature control unit 18 will depend on the gas constituents of the gaseous mixture and the separating conditions (temperature and pressure) employed in the separation module 12.

The pressure differential across the membrane or trans-membrane pressure is the prime driver for selective separation in the module 12. The pressure difference is selected from the preferred range of 10-400 kPa depending on the composition of the feed gas mixture and the desired separation process, e.g. bulk separation, high purity purification or secondary polishing of a primary separated stream. Typical values are illustrated in Examples 1 to 4 hereunder. The pressure differential is regulated by the downstream regulator valve 40 monitored by a differential pressure cell (not shown).

Figure 2:
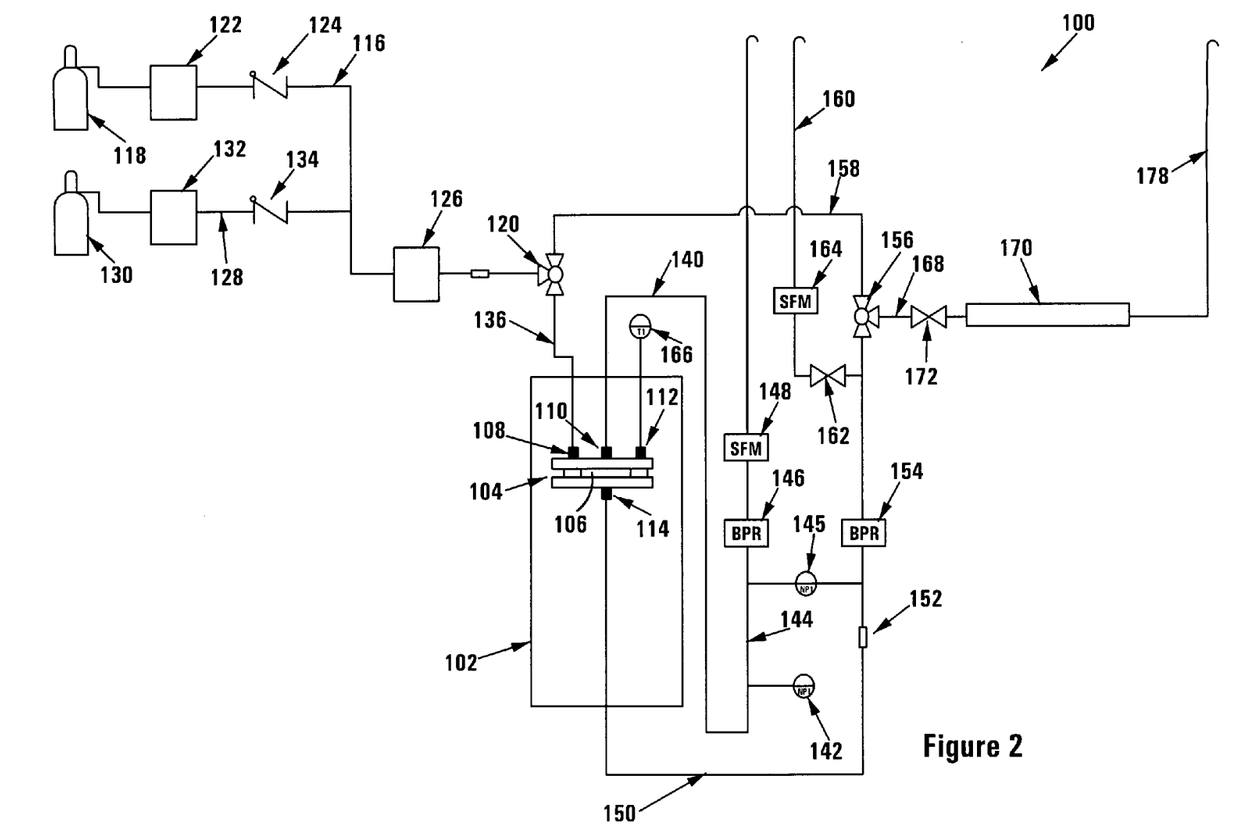
FIG. 2 shows an experimental setup that was used to demonstrate the feasibility of the process according to the first aspect of the invention for recovering a gaseous component comprising at least one fluorine-containing compound from a mixture of gaseous compounds.

Examples 1 to 4 referred to hereinafter, were carried out on an experimental setup as illustrated in FIG. 2. The experimental setup of FIG. 2 thus is suitable for carrying out the process according to the invention for recovering a gaseous component comprising at least one fluorine-containing compound from a mixture of gaseous compounds.

The purpose of Examples 1 to 4 was to demonstrate the selectivity of a PTFE coated membrane as regards recovery of different gaseous fluorine-containing compounds. From the single gas permeation results, relative selectivities for combinations or mixtures were calculated to illustrate as a first order approximation the separation effectiveness of a typical membrane in accordance with the invention.

In FIG. 2, the experimental setup is generally indicated by reference numeral 100.

The experimental setup 100 comprises a polycarbonate enclosure or oven 102 in which is located a separation module, generally indicated by reference numeral 104. The separation module 104 includes a diffusion membrane 106, three ports 108, 110 and 112 located on the upstream side of the membrane 106, and an outlet port 114 located on the downstream side of the membrane 106.

A line 116 leads from a gas cylinder 118 to a 3-way valve 120. The line 116, which typically comprises high density PVA piping with high integrity 'Swagelok' fittings, is provided with a mass flow controller 122, a check valve, 124 and a mass flow meter 126.

Another gaseous line 128 leads from a gas cylinder 130 into the line 116, upstream of the mass flow meter 126. The line 128 is fitted with a mass flow controller 132 and a check valve 134.

A line 136 leads from the 3-way valve 120 to the inlet port 108.

A retentate withdrawal line 140 leads from the port 110, and is fitted with a pressure indicator 142, a 0.5 μ filter 144, a back pressure regulator, 146 and a soap flow meter 148. Line 140 was used to vent the retentate during the experiments of Examples 1 to 4.

A permeate withdrawal line 150 leads from the outlet 114. The line 150 is also provided with a 0.5 μ filter 152 and a back pressure regulator 154. The line 150 leads into a 3-way valve 156, with a line 158 leading from the 3-way valve 156 to the 3-way valve 120 and may be used to recycle at least part of the permeate stream if required. A line 160 leads from the line 150 ahead of the 3-way valve 156, and is provided with a needle valve 162 and a soap flow meter 164. Line 160 may be used for venting the permeate stream or part of it as required.

A temperature indicator 166 is fitted to the port 112 and a differential pressure meter 145 is fitted between lines 140 and 150 to monitor the trans-membrane pressure.

A line 168 leads from the 3-way valve 156 to a gas chromatograph 170 and is provided with a needle valve 172. A discharge line 178 leads from the gas chromatograph 170.

In conducting the experiments of Examples 1 to 4 described hereinafter, one of the feed gases was thus contained in the gas cylinder 118, while another of the feed gases was contained in the gas cylinder 130.

The separation module or unit 104 was encased in the oven 102 which was ventilated (4-15 air changes per hour) and regulated at a temperature of 25° C.

In each case, the feed gas or feed gas mixture was fed into the module 104 at a regulated flow rate, by means of a mass flow controller, and maintained at a constant head pressure.

Nitrogen was supplied either from another gas cylinder similar to 118 or 130 or from a site ring supply (not shown) at 400 kPa(g) pressure, and coupled upstream of the mass flow controller 122 or 132 via another pressure regulator.

The back pressure regulators 146, 154 in the lines 140, 150 respectively, and the needle valve 162, were used to vary the trans-membrane pressure and permeate stream volume flow, monitored by the differential pressure meter 145 and soap flow meter 164.

Alternatively, and particularly when binary or ternary gas mixtures were used, the permeate gas was sampled in a bypass stream made up of the line 168, the needle valve 172 and the gas chromatograph 170, and was thus analyzed by the calibrated gas chromatograph 170.

The membrane used was a PAN (Polyacrylonitrile) filament based membrane coated on one surface with a non-porous Teflon AF 2400 layer, which was obtained for this purpose from GKSS Forschungzentrum in Geesthacht, Germany (K-V Peineman, private communication).

In Examples 1 to 4 hereunder, three gases were selected, namely $N_2$ as a reference gas, and two fluorine-containing gases, $CF_4$ and $C_3F_6$. For each, the feed pressure was varied from 50 kPa(a) to 200 kPa(a) at intervals of 50 kPa, and for each feed pressure the trans-membrane pressure or pressure drop ($\Delta P$) was increased in intervals of 10 kPa within the feed pressure bracket.

Examples 1 to 4 are dealt with separately hereunder:

EXAMPLE 1

Nitrogen ($N_2$)

Figure 3:
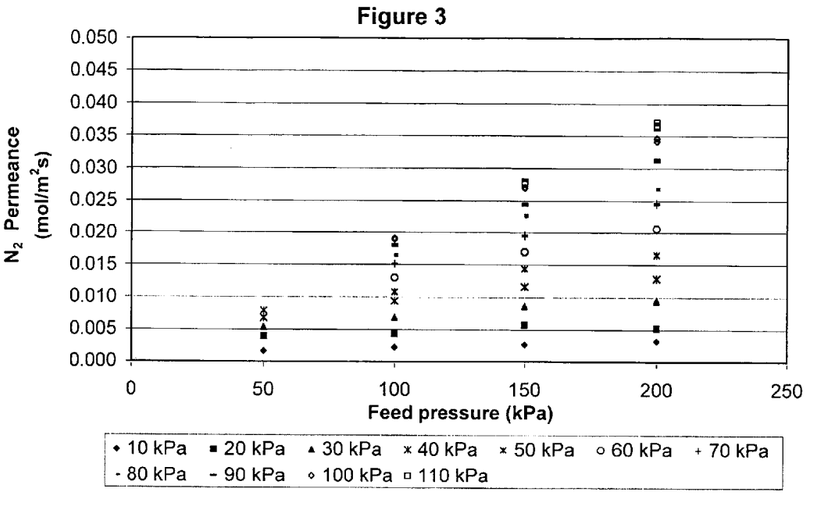
FIG. 3 shows the influence of feed pressure on $N_2$ flux density or permeance for various trans-membrane pressures, for Example 1.

The results for nitrogen ($N_2$) are summarised firstly in FIG. 3, where the dependence on the feed pressure of the permeate flux density or permeance is represented for each of the trans-membrane pressures applied (see legend box of FIG. 3). From FIG. 3, it can be seen that at trans-membrane pressures less than about 30 kPa, the feed pressure has little or insignificant influence on the flux of $N_2$ through the membrane. Only at trans-membrane pressures above this level does the feed pressure start to play a more significant role on the flux of $N_2$. Therefore, the higher the feed pressure and trans-membrane pressure, the higher the rate of permeation or permeance of nitrogen.

Figure 4:
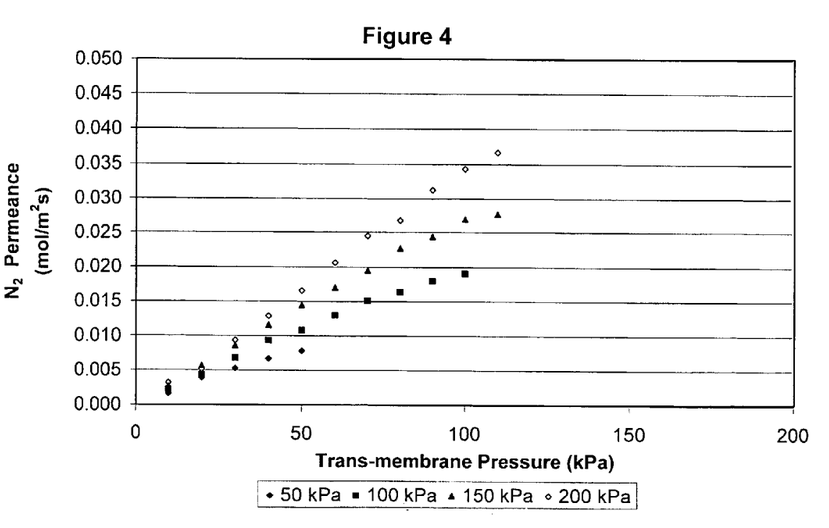
FIG. 4 shows the influence of the trans-membrane pressure on $N_2$ permeance, also for Example 1.

The dependence of the permeance on the trans-membrane pressure can be seen more clearly from FIG. 4. FIG. 4 confirms that at trans-membrane pressures below about 30 kPa, the resulting fluxes for the different feed pressures are very similar. Only at trans-membrane pressures of about 30 kPa and higher, a significant difference is demonstrated in the flux of the nitrogen. This difference becomes quite articulated at trans-membrane pressures higher than 50 kPa.

Furthermore, it is noteworthy that no results were recorded for trans-membrane pressures higher than 110 kPa, irrelevant of the feed pressure. The $N_2$ flux through the membrane reached the 100 ml/s limit of the utilised feed system for trans-membrane pressures above 110 kPa so that higher pressures could not be maintained. Thus, the maximum obtainable $N_2$ permeance for the setup 100 was calculated at 0.047 mol/m²s at a feed pressure of 200 kPa and a trans-membrane pressure of 110 kPa.

It can therefore be concluded that the membrane is highly permeable for nitrogen in a wide range of both the feed pressure and trans-membrane pressure at the given temperature of 25° C.

EXAMPLE 2

Carbon Tetrafluoride ($CF_4$)

Figure 5:
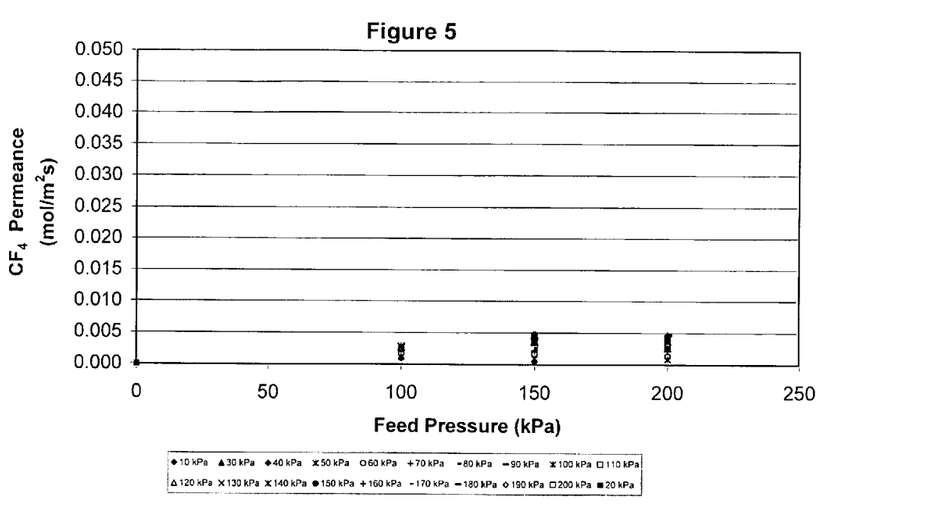
FIG. 5 shows the influence of feed pressure on $CF_4$ permeance, for Example 2.

From FIG. 5, it is immediately apparent that the flux of $CF_4$ through this membrane is extremely low as compared to nitrogen. The values vary mostly within experimental error, which makes it difficult to unambiguously determine the dependence of the $CF_4$ permeance on the two pressure parameters. Thus, from FIG. 5, the feed pressure apparently is not a significant driver of the $CF_4$ flux, although it seems to peak or level out around a feed pressure of 150 kPa.

Figure 6:
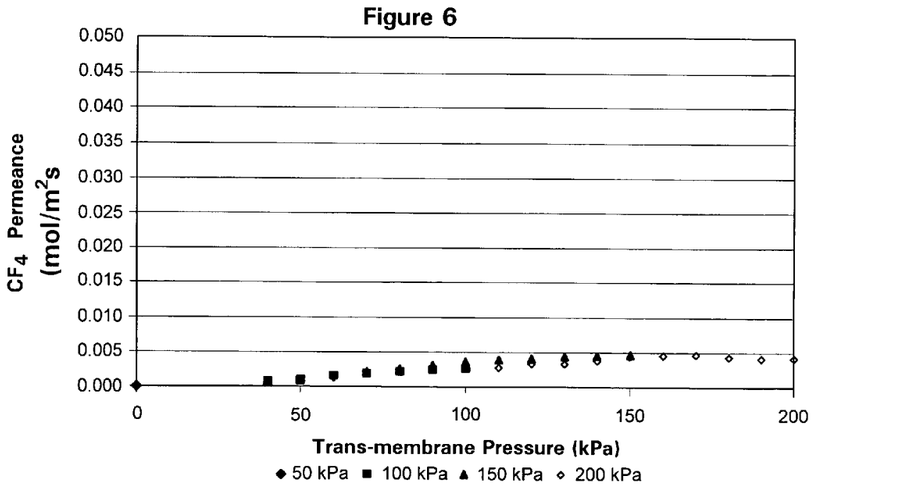
FIG. 6 shows the influence of trans-membrane pressure on $CF_4$ permeance, also for Example 2.

Looking at the dependence of the permeance on the trans-membrane pressure for various feed pressures in FIG. 6, it can first of all be confirmed that the feed pressure is substantially irrelevant to $CF_4$ permeance, except that the feed pressure has to be above a threshold value of somewhere between 50 kPa and 100 kPa. It also confirms that the $CF_4$ permeance seems to maximise or level out at a feed pressure of about 150 kPa to a value of about 0.07 mol/m²s. Hence, in the case of $CF_4$, the trans-membrane pressure is the dominant parameter with a preferred value of at least 50 kPa at a feed pressure of about 150 kPa.

It is important to note that at the feed pressure of 50 kPa, no $CF_4$ was able to permeate the membrane—see FIG. 5, irrelevant of the trans-membrane pressure and that for higher feed pressures, $CF_4$ permeate was only detected at trans-membrane pressures of at least 40 kPa. This phenomenon makes the membrane of the present invention a suitable barrier for $CF_4$ at the lower end of the relevant pressure ranges.

EXAMPLE 3

Hexafluoropropylene ($C_3F_6$)

Figure 7:
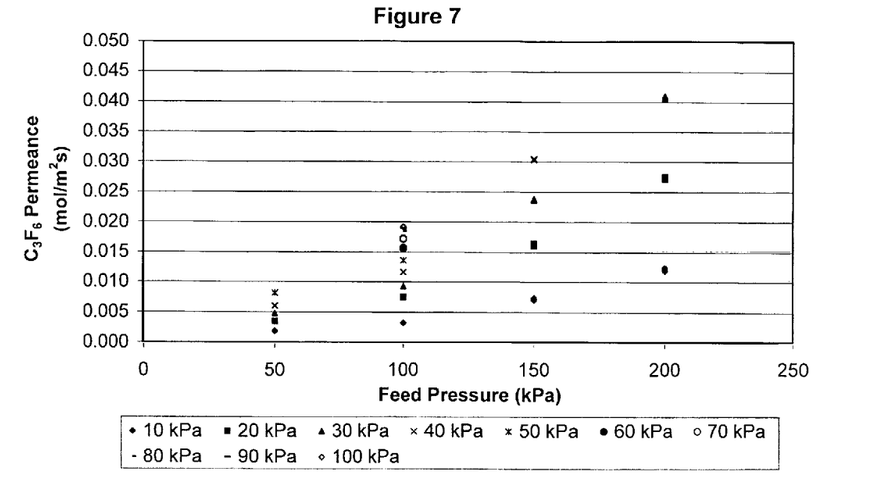
FIG. 7 shows the influence of feed pressure on $C_3F_6$ permeance, for Example 3.
Figure 8:
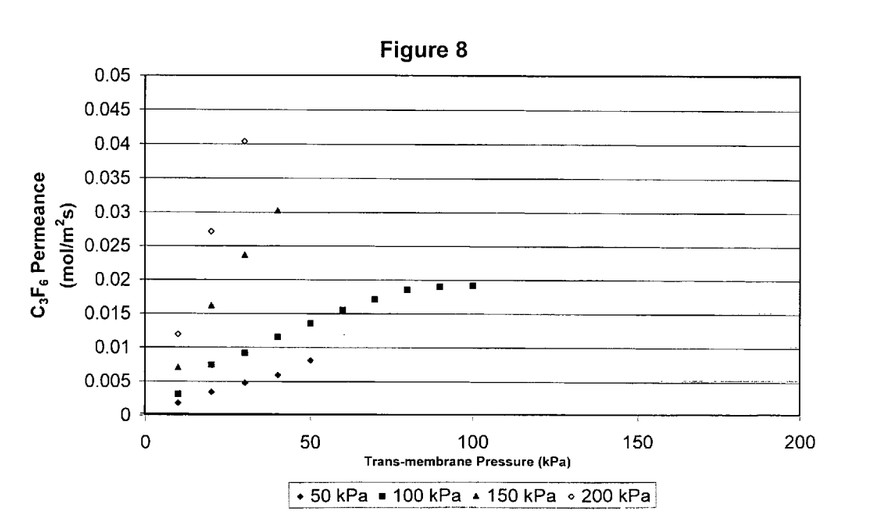
FIG. 8 shows the influence of trans-membrane pressure on $C_3F_6$ permeance, also for Example 3.

Using the same experimental method as in the previous examples, the permeance of $C_3F_6$ as a function of the two pressure parameters was determined and is shown in FIGS. 7 and 8.

From FIG. 7, it can be seen that the feed pressure has a significant influence on the permeance of $C_3F_6$, with the flux increasing exponentially as the feed pressure increases. This is accentuated in FIG. 8, where the permeance curves are clearly distinguishable for the different feed pressures.

Also noticeable from FIG. 8, is the strong influence of the trans-membrane pressure differential. Roughly, the flux increases linearly with the pressure differential apparently reaching a saturation level somewhere between 50 kPa and 100 kPa, as suggested by the 100 kPa feed pressure curve. Once again, for feed pressures above 100 kPa, the flux hit the 100 ml/min flow limit at surprisingly low trans-membrane pressures. For the current experimental setup a maximum permeance of 0.043 mol/m²s was obtained at a feed pressure of 200 kPa and a trans-membrane pressure of 30 kPa. Obviously, a system allowing a higher flow rate will yield higher flux at increased trans-membrane pressures.

Hence, clearly the membrane of the present invention offers an extremely high permeability for $C_3F_6$.

Surprisingly too, the present membrane process apparently offers a selectivity, which sharply differentiates between various gaseous fluorocarbon species, making it an ideal separation technique for such molecules. This finding is further illustrated by the calculated binary selectivities in the Example 4:

EXAMPLE 4

Relative Selectivity

Figure 9:
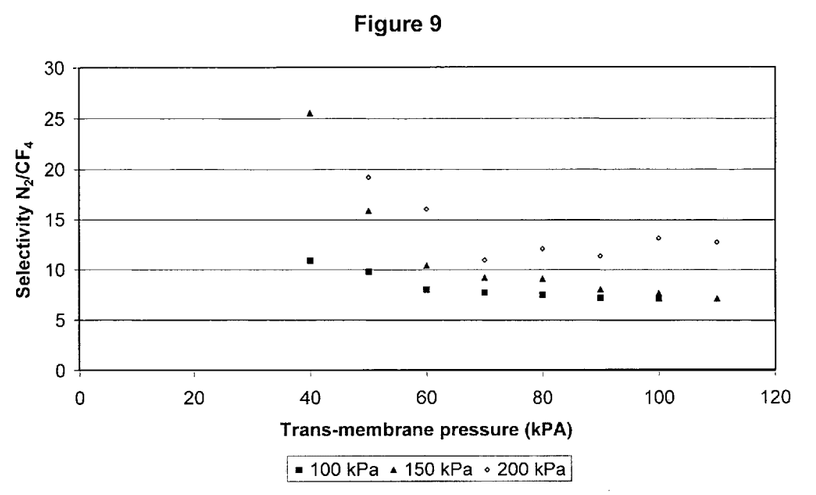
FIG. 9 shows selectivity of $N_2$ relative to $CF_4$, for Example 4.
Figure 10:
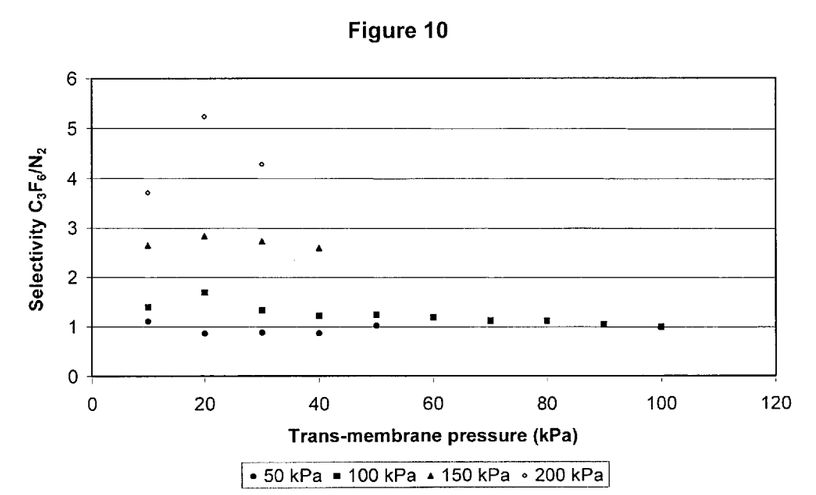
FIG. 10 shows selectivity of $C_3F_6$ relative to $N_2$, also for Example 4.

The above permeation results were converted to relative selectivity in terms of the ratio of flux density or permeance values for the binary systems of $CF_4$ and $C_3F_6$ relative to $N_2$ and are shown respectively in FIG. 9 and FIG. 10. These results confirm the high selectivity towards $C_3F_6$ and low selectivity towards $CF_4$, with $N_2$ at an average selectivity, as specifically apparent by the trends in the single gas permeance curves of FIGS. 8, 6 and 4 respectively. Example of preferred ranges of conditions, derived for optimum selectivity and permeance configurations are set out in Table 1.

Although indicated in Table 1, the selectivity of $C_3F_6$ relative to $CF_4$ is not shown graphically. Comparing FIG. 8 with FIG. 6, the permeance for $C_3F_6$ at trans-membrane pressure below about 50 kPa is so high relative to that of $CF_4$, especially at the higher feed pressures of 150 and 200 kPa, that the selectivity of $C_3F_6$ relative to $CF_4$ approaches infinity.

TABLE 1

Optimum selectivity conditions.

| Binary system | Typical selectivity | Feed pressure (kPa) | Trans-membrane pressure (kPa) |
|---|---|---|---|
| $N_2/CF_4$ | 15->~30 (est) | ~200 | <~30 |
| $C_3F_6/N_2$ | 5.24 | ~200 | 20 |
| $C_3F_6/CF_4$ | 50->~100 (est) | 50-200 | <50 |

It is thus observed that the wide range of surprisingly good to excellent selectivities, with some values approaching infinity, afford a chemically stable and an unforeseen effective and efficient gas separation process for a range of generally corrosive and/or hazardous fluorocarbon gas mixtures.

In particular, the PAN membrane coated with Teflon AF 2400 as exemplified in this disclosure is capable of separating specific binary gas systems, under a range of conditions, as indicated in Table 1.

As a further implication of the wide range of operating conditions applicable to the membranes used in the process in accordance with this invention, the possibility of providing both practical multi-stage and hybrid separation processes or systems, unexpectedly arose.

One embodiment of an envisaged multi-stage process or system may include, for example, at least one roughing step with high flux and very acceptable selectivity at high feed and trans-membrane differential pressures and at least one polishing step with relative lower flux, but extremely high selectivity at lower feed and trans-membrane pressure levels, as also hereinbefore described.

Figure 11:
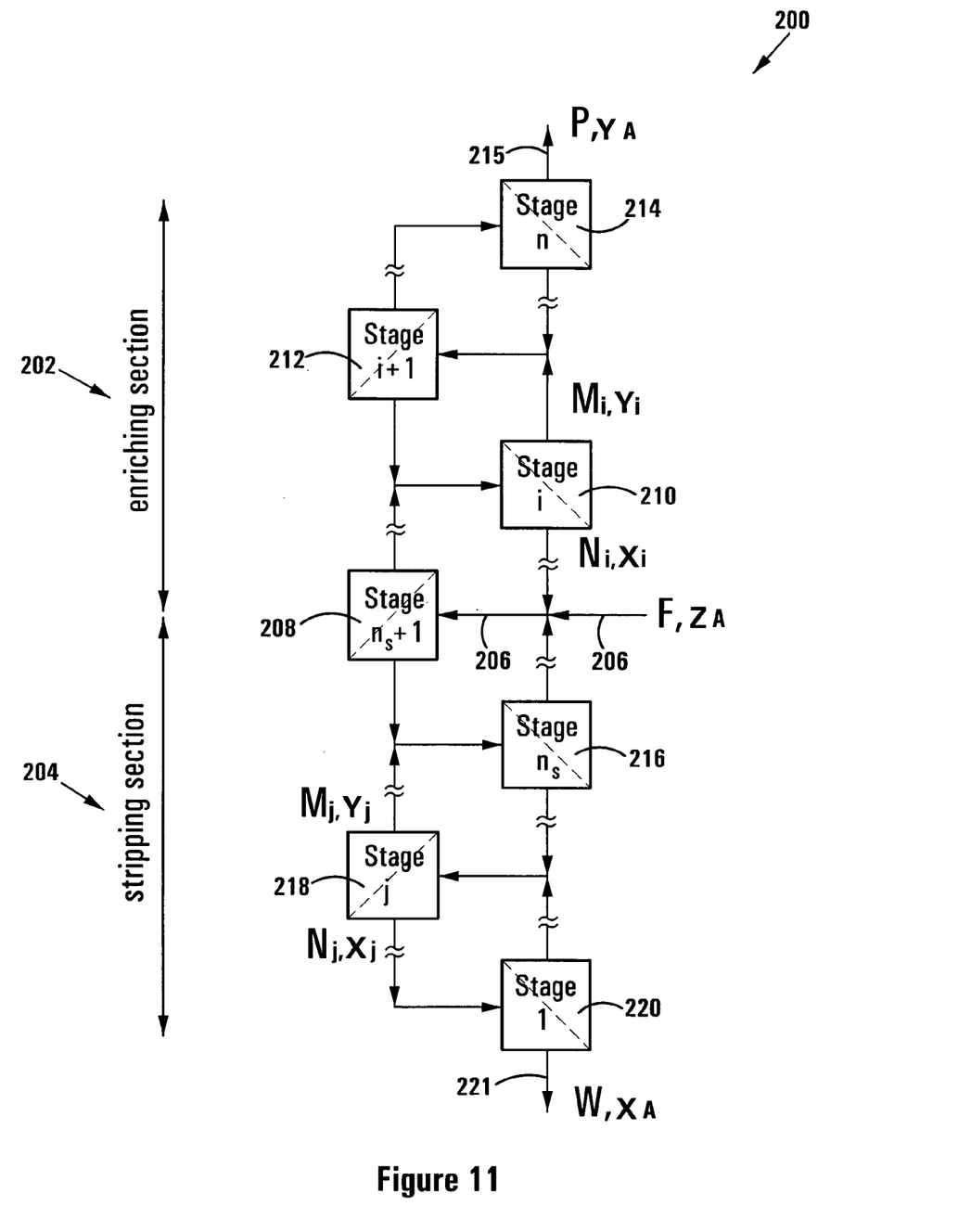
FIG. 11 shows, in simplified flow diagram form, a multi-stage process according to another embodiment of the invention.

An embodiment of a specific implementation of such a multi-stage process and system is illustrated in FIG. 11, where a number of membrane stages (separation zones) all operate under gradually varying conditions in a counter-current recirculation cascade unit, generally indicated by reference numeral 200, to achieve a higher combined separation efficiency and yield than is achievable in a single or two-stage unit and under acceptable flow rates and pressure values.

The cascade unit 200 comprises an enriching section 202 and a stripping section 204. A feed F, with composition $z_A$ of constituent A enters, along a flow line 206, at stage $n_s+1$ (designated by reference numeral 208), where the composition under operating conditions in recirculation mode will be as close as possible to $z_A$. The permeate concentration is enriched with those compounds of high permeability in the enrichment section 202, while the stripping section 204 gets enriched with those compounds of low permeability. The enriching section also includes stages 210, 212 and 214, while the stripping section also includes stages 216, 218 and 220. It will, however, be appreciated that a greater number of stages can be provided in the enriching section and/or in the stripping section. The final permeate P with constituent A molar composition $y_A$ is drawn off from stage n (stage 214), along a flow line 215, and the final retentate W with constituent A molar composition $x_A$ is drawn off from stage 1 (stage 220), along flow line 221. The number of stages and recirculation ratio will affect the degree of separation. The recirculation ratio is defined as the permeate recirculation flow rate divided by the permeate flow rate. As an example of how to achieve molar flow balance, the composition $x_{i+1}$ of the retentate stream from stage i+1 (stage 212) entering stage i (stage 210) with molar flow $N_{i+1}$ should be equal to the composition $y_{i-1}$ of the permeate from stage i−1 (not shown) with its molar flow $M_{i-1}$, combining into the feed of stage i (stage 210) with a total feed molar flow of $N_{i+1}+M_{i-1}$.

Each of the stages 208 contains a membrane similar to the membrane 14 or 106 as hereinbefore described.

Figure 12:
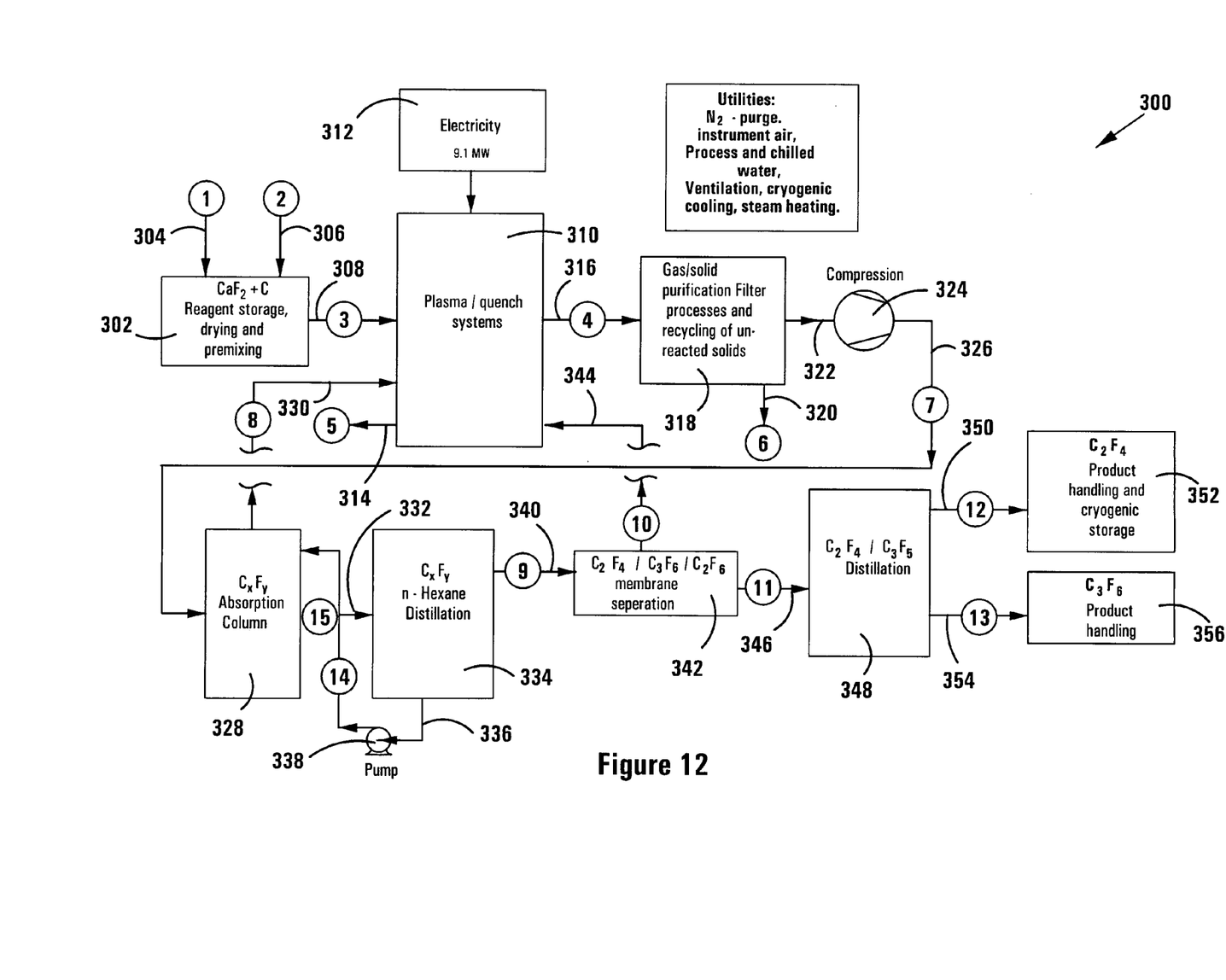
FIG. 12 shows, also in simplified flow diagram form, a hybrid process according to yet another embodiment of the invention.

An embodiment of a hybrid separation system has been conceptualised and designed to provide for the production of 2500 t/a $C_2F_4$ and 625 t/a $C_3F_6$, both of purity, 96%, utilising a transfer-arc plasma in a system as depicted in FIG. 12. The separation of four $C_xF_y$ products from such a setup, namely $CF_4$, $C_2F_6$, $C_2F_4$, and $C_3F_6$; was theoretically evaluated as represented in Table 2.

The basic process description as shown in FIG. 12 embodies a 9.3 MW plasma reactor for producing fluorocarbon ($C_xF_y$) products, a compressor section, multi-module separation section and product storage and handling facility.

More specifically, the basic process of FIG. 12 is designated by reference numeral 300.

The process 300 includes a reagent storage, drying and premixing stage 302, with a $CaF_2$ feed line 304 (stream 1) and a C feed line 306 (stream 2) leading into the stage 302. A transfer line 308 (stream 3) leads from the stage 302 into plasma/quench stage 310. An electricity provision stage 312 provides an electrical supply to the stage 310. A $CaC_2$ withdrawal line 314 (stream 5) leads from the stage 310, as does a transfer line 316 (stream 4).

The transfer line 316 leads into a gas/solids purification or filtration stage 318. A solids withdrawal line 320 (stream 6) leads from the stage 318, as does a gaseous stream withdrawal line 322. The line 322 leads into a compressor 324, with a transfer line 326 (stream 7) leading from the compressor into a CxFy absorption stage or column 328. A $CF_4$ recycle line 330 (stream 8) leads from the stage 328 back to the stage 310.

A transfer line 332 (stream 15) leads from the stage 328 to a CxFy/n-hexane distillation stage 334. A bottoms line 336 (stream 14), fitted with a pump 338, leads from the stage 334 back to the stage 328

A transfer line 340 (stream 9) leads from the stage 334 to a $C_2F_4/C_2F_6/C_3F_6$ membrane separation stage 342. It will be appreciated that the stage 342 contains membranes similar to the membrane 14 or the membrane 106 hereinbefore described. The membrane stage separates a $C_2F_6$ rich fraction from a $C_2F_4/C_3F_6$ rich fraction, in accordance with the invention. A $C_2F_6$ line 344 (stream 10) leads from the stage 342 back to the stage 310, while a $C_2F_4/C_3F_6$ transfer line 346 (stream 11) leads from the stage 342 to a $C_2F_4/C_3F_6$ distillation stage 348.

A $C_2F_4$ product withdrawal line 350 (stream 12) leads from the stage 348 to a product handling and cryogenic storage stage 352.

A $C_3F_4$ product withdrawal line 354 (stream 13) leads from the stage 348 to a product handling stage 356.

The first separation stage or absorption column 328 is to separate $CF_4$ (60%) from the $C_xF_y$ gas mixture (40%); $CF_4$ is recycled back to the plasma stage (stream 8). $CF_4$ separation is done by using n-hexane to absorb $C_2F_4$, and the heavy key $C_2F_6$ and $C_3F_6$ gases from the gas stream. The enriched n-hexane mixture is distilled in the distillation column 334 from the $C_xF_y$ gases. The n-hexane is cooled and recycled (stream 14) to the absorber as absorbent.

The gases (stream 9) from the n-hexane distillation go through a multi-stage membrane cascade (stage 342) separating the $C_2F_6$ (5%) (stream 10) from the $C_xF_y$ gas (stream 11), at a selectivity of about 2 or higher for each stage. The $C_2F_4$ (25%) (stream 12) and $C_3F_6$ (8%) (stream 13) are cryogenically distilled to 96% purity in stage 348. A 2% bottom separation product of the stage 348 is recycled back to the $C_xF_y$ production system (not shown).

TABLE 2

Design calculations for a transfer-arc plasma $C_xF_y$ gas production system with a 15 stage recirculation cascade membrane separation stage or unit 342 as in FIG. 12.

| | Molar mass | | Streams | | | | | | | |
|---|---|---|---|---|---|---|---|---|---|---|
| Mass Flow | kg/kmol | Units | 1 | 2 | 3 | 4 | 5 | 6 | 7 | 8 |
| $CaF_2$ (s) | 78.00 | kg/h | 1474.36 | | 1474.36 | | | | | |
| C (s) | 12.00 | kg/h | | 397.44 | 397.44 | | | | | |
| $C_2F_4$ | 100.00 | kg/h | | | | 355.56 | | | 355.56 | 3.56 |
| $C_2F_6$ | 138.00 | kg/h | | | | 88.89 | | | 88.89 | 0.89 |
| $C_3F_6$ | 150.00 | kg/h | | | | 88.89 | | | 88.89 | 0.89 |
| $CF_4$ | 88.00 | kg/h | | | | 355.56 | | | 355.56 | 355.56 |
| $CaC_2$ | 52.00 | kg/h | | | | 982.91 | 894.02 | 88.89 | | |
| $C_6H_{14}$ | 86 | kg/h | | | | | | | | 0.043 |
| Total | | kg/h | 1474.36 | 397.44 | 1871.80 | 1871.80 | 894.02 | 88.89 | 888.89 | 360.89 |
| $CaF_2$ (s) | 78.00 | kmol/h | 18.90 | | 18.90 | | | | | |
| C (s) | 12.00 | kmol/h | | 33.12 | 33.12 | | | | | |
| $C_2F_4$ | 100.00 | kmol/h | | | | 3.56 | | | 3.56 | 0.04 |
| $C_2F_6$ | 138.00 | kmol/h | | | | 0.64 | | | 0.64 | 0.01 |
| $C_3F_6$ | 150.00 | kmol/h | | | | 0.59 | | | 0.59 | 0.01 |
| $CF_4$ | 88.00 | kmol/h | | | | 4.04 | | | 4.04 | 4.04 |
| $CaC_2$ | 52.00 | kmol/h | | | | 18.90 | 17.19 | 1.71 | | |
| $C_6H_{14}$ | 86 | kmol/h | | | | | | | | 0.0005 |
| Total | | kmol/h | 18.90 | 33.12 | 52.02 | 27.73 | 17.19 | 1.71 | 8.83 | 4.09 |
| Process parameters | | | | | | | | | | |
| Temperature | | °C. | 25 | 25 | 25 | 250 | 250 | 25 | 25 | −75/25 |
| Pressure (a) | | kPa | 87 | 87 | −40 | −40 | 87 | 87 | 200 | 200/150 |

| | Molar mass | | Streams | | | | | | |
|---|---|---|---|---|---|---|---|---|---|
| Mass Flow | kg/kmol | Units | 9 | 10 | 11 | 12 | 13 | 14 | 15 |
| $CaF_2$ (s) | 78.00 | kg/h | | | | | | | |
| C (s) | 12.00 | kg/h | | | | | | | |
| $C_2F_4$ | 100.00 | kg/h | 352.00 | 1.06 | 350.94 | 347.43 | 3.51 | | 352.00 |
| $C_2F_6$ | 138.00 | kg/h | 88.00 | 87.12 | 0.88 | 0.87 | 0.01 | | 88.00 |
| $C_3F_6$ | 150.00 | kg/h | 88.00 | 0.26 | 87.74 | 0.88 | 86.86 | | 88.00 |
| $CF_4$ | 88.00 | kg/h | | | | | | | |
| $CaC_2$ | 52.00 | kg/h | | | | | | | |
| $C_6H_{14}$ | 86 | kg/h | | | | | | 59080 | 59080 |
| Total | | kg/h | 528.00 | 88.44 | 439.56 | 349.18 | 90.38 | 59080 | 59608 |
| $CaF_2$ (s) | 78.00 | kmol/h | | | | | | | |
| C (s) | 12.00 | kmol/h | | | | | | | |
| $C_2F_4$ | 100.00 | kmol/h | 3.52 | 0.01 | 3.51 | 3.47 | 0.04 | | 3.52 |
| $C_2F_6$ | 138.00 | kmol/h | 0.64 | 0.63 | 0.01 | 0.01 | 0.00 | | 0.64 |
| $C_3F_6$ | 150.00 | kmol/h | 0.59 | 0.002 | 0.58 | 0.01 | 0.58 | | 0.59 |
| $CF_4$ | 88.00 | kmol/h | | | | | | | |
| $CaC_2$ | 52.00 | kmol/h | | | | | | | |
| $C_6H_{14}$ | 86 | kmol/h | | | | | | 686.98 | 686.98 |
| Total | | kmol/h | 4.74 | 0.64 | 4.10 | 3.49 | 0.61 | 686.98 | 691.72 |

TABLE 2-continued

Design calculations for a transfer-arc plasma $C_xF_y$ gas production system with a 15 stage recirculation cascade membrane separation stage or unit 342 as in FIG. 12.

| Process parameters | | | | | | | | |
|---|---|---|---|---|---|---|---|---|
| Temperature | ° C. | 25 | 25 | 25 | −50 | 25 | 25 | 25 |
| Pressure (a) | kPa | 200 | 200 | 200 | 200 | 150 | 200 | 200 |

The invention claimed is:

1. A process for recovering a gaseous component comprising at least one fluorocarbon consisting of carbon and fluorine atoms only from a mixture of gaseous fluorocarbons consisting of carbon and fluorine atoms only, which process includes
in a separation zone, bringing a gaseous mixture of two or more different fluorocarbons consisting of carbon and fluorine atoms only into contact with a gas permeable separating medium comprising a non-porous fluoropolymer, so that a first gaseous component comprising the at least one fluorocarbon consisting of carbon and fluorine atoms only is separated from a second gaseous component comprising the balance of the fluorocarbons;
withdrawing the first gaseous component from the separation zone as a permeate or a retentate; and
withdrawing the second gaseous component from the separation zone as the retentate, when the first gaseous component is withdrawn as the permeate, and as the permeate, when the first gaseous component is withdrawn as the retentate.

2. A process according to claim 1, wherein the mixture of gaseous fluorocarbons consisting of carbon and fluorine atoms only is a binary gaseous mixture comprising two different gaseous fluorocarbons consisting of carbon and fluorine atoms only selected from carbon tetrafluoride ($CF_4$), tetrafluoroethylene ($C_2F_4$), hexafluoroethane ($C_2F_6$), hexafluoropropylene ($C_3F_6$), octafluoropropane ($C_3F_8$) and octafluorobutylene or an isomer thereof ($C_4F_8$-isomer) in admixture with each other.

3. A process according to claim 1 or claim 2, wherein the separating medium comprises a diffusion membrane, with at least a portion of the membrane comprising the non-porous fluoropolymer.

4. A process according to claim 3, wherein the membrane comprises a porous base of filamentous material, with at least one outer surface of the base being coated with the non-porous fluoropolymer.

5. A process according to claim 4, wherein the porous base of the membrane comprises a plurality of intermingled or interwoven filaments of polyacrylonitrile (PAN) or polytetrafluoroethylene (PTFE), and wherein the non-porous fluoropolymer is non-porous PTFE.

6. A process according to claim 3, wherein the membrane comprises a porous base of filamentous material, with the filamentous material being at least partially impregnated with the non-porous fluoropolymer.

7. A process according to claim 6, wherein the porous base of the membrane comprises a plurality of intermingled or interwoven filaments of polyacrylonitrile (PAN) or polytetrafluoroethylene (PTFE), and wherein the non-porous fluoropolymer is non-porous PTFE.

8. A process according to claim 3, which includes controlling the temperature in the separation zone at between −100° C. and +200° C. while the mixture of gaseous fluorocarbons consisting of carbon and fluorine atoms only is being separated into the first and second gaseous components.

9. A process according to claim 3, which includes controlling the separation zone, upstream of the membrane, at an elevated pressure of up to 200 bar(a).

10. A process according to claim 3, wherein the separation zone is a first separation zone, with a second separation zone, also containing a membrane of which at least a portion comprises a non-porous fluoropolymer, being provided, the membrane of the second separation zone having a different flux and/or a different selectivity towards the fluorocarbon than the membrane of the first separation zone, and with the process including
introducing the mixture of gaseous fluorocarbons consisting of carbon and fluorine atoms only into the first separation zone, with the first gaseous component including, in addition to the at least one fluorocarbon consisting of carbon and fluorine atoms only, also at least one other gaseous fluorocarbon as a contaminant;
feeding the first gaseous component into the second separation zone; and
withdrawing, from the second separation zone, and as a permeate or a retentate, the second gaseous component which has a higher concentration of the fluorocarbon consisting of carbon and fluorine atoms only than the first gaseous component.

* * * * *

UNITED STATES PATENT AND TRADEMARK OFFICE
CERTIFICATE OF CORRECTION

PATENT NO.       : 8,512,441 B2                                                    Page 1 of 1
APPLICATION NO.  : 13/001769
DATED            : August 20, 2013
INVENTOR(S)      : Nel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this
Fifteenth Day of September, 2015

Michelle K. Lee
*Director of the United States Patent and Trademark Office*